US006456775B1

(12) United States Patent
Johnson et al.

(10) Patent No.: US 6,456,775 B1
(45) Date of Patent: Sep. 24, 2002

(54) OPTICAL FIBER ATTENUATOR

(75) Inventors: Warren Johnson, Wilmington, DE (US); N. John Nagurny, Haddonfield, NJ (US)

(73) Assignee: General Instrument Corporation, Horsham, PA (US)

( * ) Notice: Subject to any disclaimer, the term of this patent is extended or adjusted under 35 U.S.C. 154(b) by 0 days.

(21) Appl. No.: 09/826,523

(22) Filed: Apr. 5, 2001

(51) Int. Cl.$^7$ ................................................ G02B 6/36
(52) U.S. Cl. ............................ 385/140; 385/15; 385/39
(58) Field of Search ......................... 385/15, 39, 137, 385/140

(56) References Cited

U.S. PATENT DOCUMENTS

| | | | | |
|---|---|---|---|---|
| 3,893,753 A | * | 7/1975 | Glenn | 359/232 |
| 4,664,484 A | * | 5/1987 | Hines | 359/488 |
| 4,697,869 A | | 10/1987 | Vincent et al. | 385/140 |
| 4,852,964 A | | 8/1989 | Holland et al. | 385/111 |
| 5,319,734 A | | 6/1994 | Buzzetti | 385/140 |

OTHER PUBLICATIONS

NANOMETER TECHNOLOGIES, Variable Attenuators—2000 Series, Web Page —http://www.nanometer.com/Products/Attenuators/Atten_Variable/atten_variable.htm, (Admitted Prior Art).

* cited by examiner

Primary Examiner—Robert H. Kim
Assistant Examiner—Therese Barber
(74) Attorney, Agent, or Firm—Akin, Gump, Strauss, Hauer & Feld, L.L.P.

(57) ABSTRACT

An optical fiber attenuator for adjusting the attenuation of a fiber optic cable, including a generally L-shaped housing with a spring clip positioned within the housing. The spring clip is adjustably positioned to change and hold the radius of curvature of a fiber optic cable wrapped around the spring clip. The fiber optic attenuator is fitted with a movable arm mounted to its housing which engages and adjusts the spring clip through a plurality of positions to adjust the position of the spring clip, thereby adjusting the attenuation of the fiber optic cable.

14 Claims, 3 Drawing Sheets

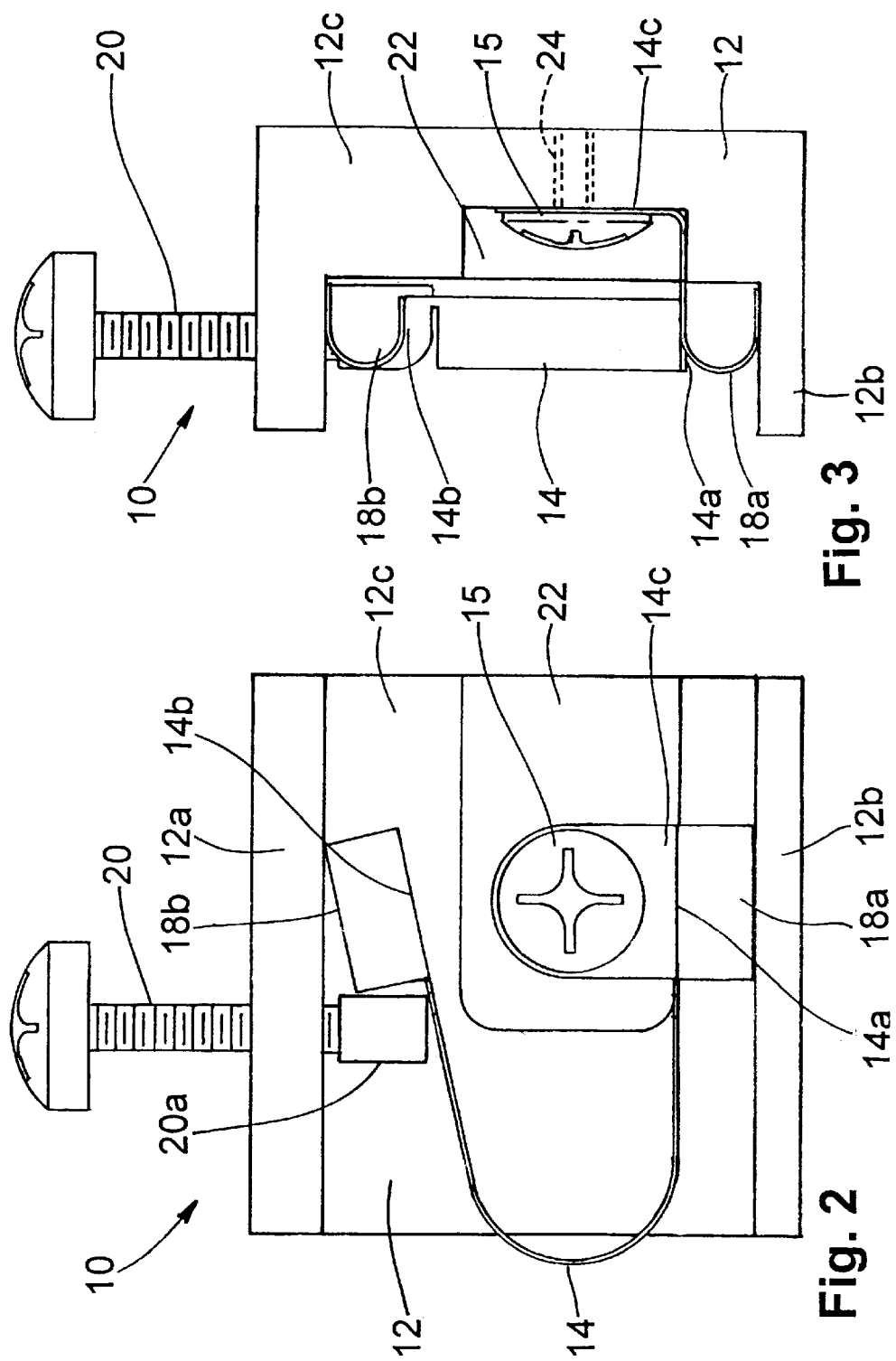

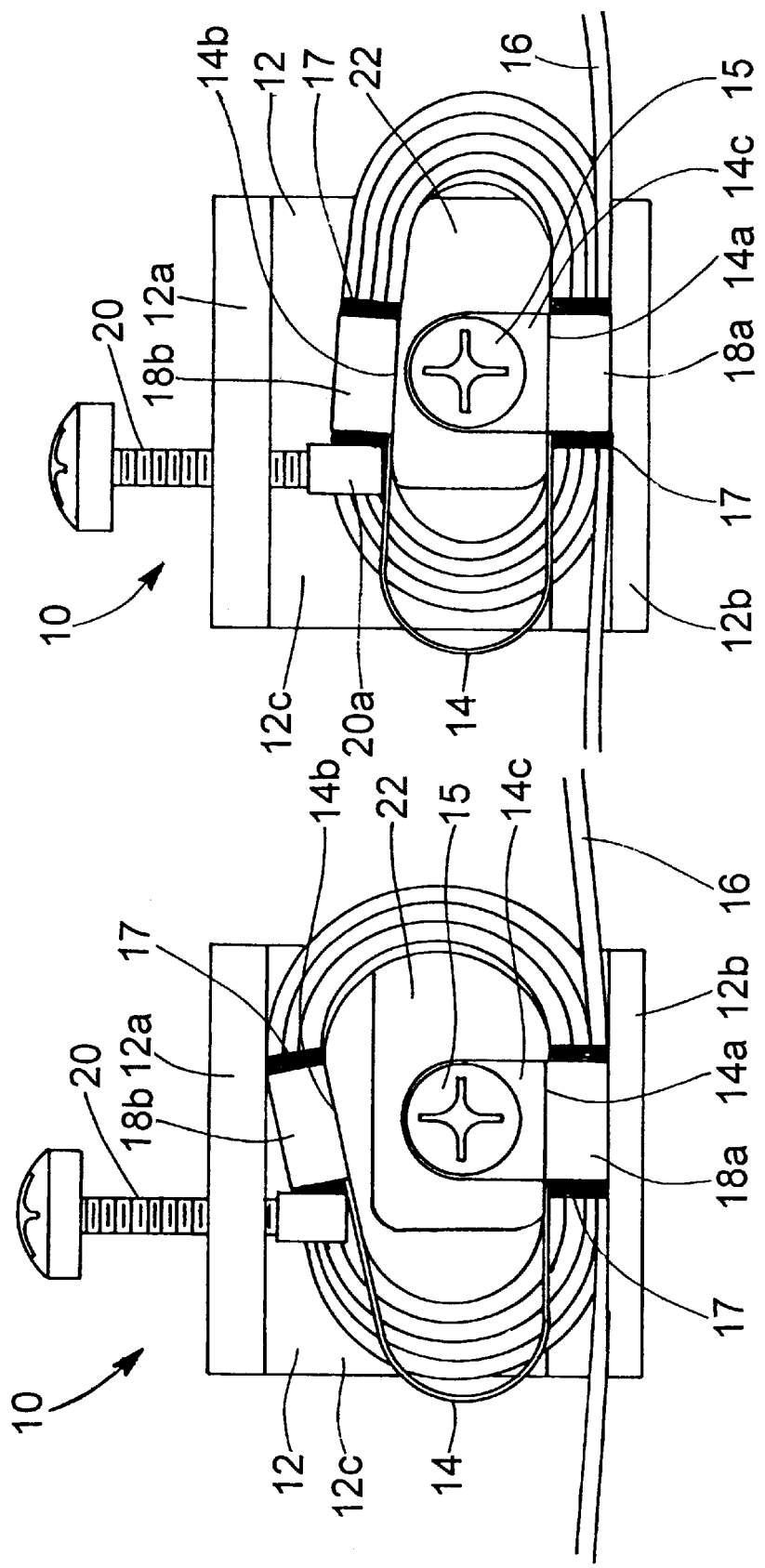

OPTICAL FIBER ATTENUATOR

BACKGROUND OF THE INVENTION

1. Field of the Invention

The present invention relates to an optical fiber attenuator, and more particularly an apparatus for inducing a controllable and consistent light loss or attenuation in a fiber optic cable.

2. Background Information

The present invention is directed to an optical fiber attenuator, which permits variation of the bend radius of a fiber optic cable, thereby inducing a controllable and consistent light loss or attenuation in the fiber optic cable. More particularly, the optical fiber variable attenuator varies the light loss in a fiber optic cable by varying the bend radius of the fiber optic cable which is wrapped around a mechanical spring clip.

The broad general concept of modifying the attenuation of a fiber optic cable by wrapping the fiber optic cable around a diameter and changing the radius of curvature of the wrapped fiber optic cable is generally well known. Bending fiber optic cable causes light loss in the cladding of the fiber optic cable and is employed in industries which utilize fiber optics. For example, the optical fiber variable attenuator may find application in the broad band cable television field.

Recent developments in a Transimpedence Amplifier (TIA) Return Path Receiver have brought about a number of performance and cost enhancements. However, these improved TIA Return Path Receivers do not operate at optical levels much greater than 0 dbm. Conventional optical fiber attenuators operate in an attenuation range which is outside of the optimal attenuation range of the improved TIA Return Path Receiver. In addition, conventional optical fiber attenuators are relatively complicated and relatively expensive to manufacture. An economic means to provide light at optimal attenuation ranges for the improved TIA Return Path Receivers is needed that will permit an overall gain reduction without degrading noise figures or return losses.

The present invention provides an optical fiber attenuator that is relatively inexpensive and permits easy adjustment of the attenuation. More particularly, the optical fiber attenuator of the present invention provides an adjustable spring clip in a housing. The fiber optic cable is wrapped around the spring clip in one or more loops. Adjusting the position of the spring clip modifies the radius of curvature of the loops and hence modifies the attenuation of the fiber optic cable.

BRIEF SUMMARY OF THE INVENTION

Briefly stated, the present invention comprises an optical fiber attenuator for adjusting the attenuation of a fiber optic cable. The optical fiber attenuator is comprised of a channel housing having a generally L-shaped cross section with a first leg and a base extending therefrom. A spring clip having a first end and a second end is positioned within the channel housing. The first end of the spring clip is secured to the channel housing while the second end of the spring clip is adjustably positioned to move between a first position adjacent the second leg of the channel housing and a second position adjacent the first end of the spring clip. A fiber optic cable can be wrapped around the spring clip such that as the second end of the spring clip is moved between the first and second positions, the attenuation of the fiber optic cable is modified by changing a radius of curvature of the fiber optic cable.

In another aspect, the present invention is a combination fiber optic cable and optical fiber attenuator for adjusting an attenuation of the fiber optic cable. The combination comprises a channel housing which is generally L-shaped in cross section. The channel housing includes a first leg and a base extending therefrom. A spring clip is positioned within the channel housing. The spring clip has a first end and a second end. The first end is secured to the first leg. The second end is adjustably positioned to move between a first position adjacent the second leg and a second position adjacent the first end of the clip. A fiber optic cable is wrapped around the spring clip such that as the second end of the spring clip is moved between the first and second positions the attenuation of the fiber optic cable is modified by changing a radius of curvature of the fiber optic cable.

BRIEF DESCRIPTION OF THE SEVERAL VIEWS OF THE DRAWINGS

The present invention will hereinafter be described in conjunction with the appended drawing figure(s), wherein like numerals denote like elements, and:

FIG. 2 is a front elevation view of the optical fiber variable attenuator shown in FIG. 1;

FIG. 3 is a right side elevation view of the optical fiber variable attenuator shown in FIG. 1;

FIG. 4 is a front elevation view of the optical fiber variable attenuator shown in FIG. 1 with a fiber optic cable wrapped around a spring clip of the fiber optic variable attenuator; and FIG. 5 is a front elevation view of the optical fiber variable attenuator shown in FIG. 4 with a spring clip adjusted such that the attenuation of the fiber optic cable is modified from that shown in FIG. 4.

DETAILED DESCRIPTION OF THE INVENTION

Figure 1:
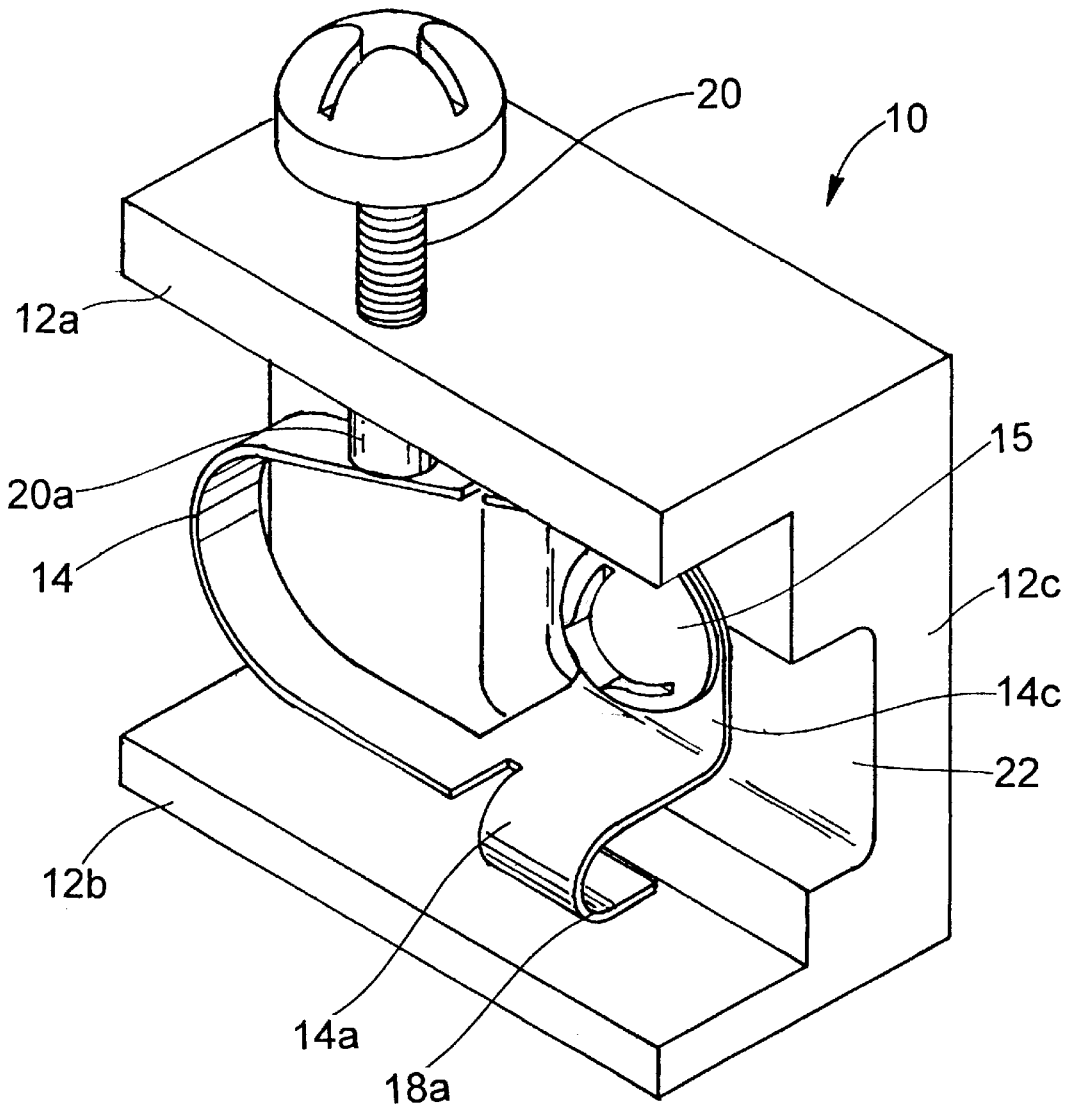
FIG. 1 is a right side perspective view of the optical fiber variable attenuator in accordance with a preferred embodiment of the present invention.

The ensuing detailed description provides preferred exemplary embodiments only, and is not intended to limit the scope, applicability, or configuration of the invention. Rather, the ensuing detailed description of the preferred exemplary embodiment(s) will provide those skilled in the art with an enabling description for implementing a preferred exemplary embodiment of the invention. It being understood that various changes may be made in the function and arrangement of elements without departing from the spirit and scope of the invention as set forth in the appended claims.

Referring to the drawings in detail, wherein like numerals indicate like elements throughout, there is shown in FIGS. 1 through 5, a preferred embodiment of an optical fiber attenuator, generally designated 10, for adjusting an attenuation of a fiber optic cable 16 in accordance with the present invention.

Referring now to FIGS. 1, 2 and 3, in the preferred embodiment, the optical fiber attenuator 10 includes a channel housing 12 having a generally U-shaped cross section with a first leg 12a, a second leg 12b and a base 12c extending therebetween. It is preferred that the channel housing 12 be constructed of a rigid metallic material formed into the general U-shape discussed above. For example, the channel housing 12 can be constructed of aluminum which is machined, extruded dye cast, or stamped into a generally U-shape. However, those skilled in the art will realize that the channel housing 12 may be constructed of a metallic, polymeric or like material, which can take on the general U-shape of the channel housing 12 and is rigid enough to retain its general shape during operation of the optical fiber attenuator 10. For example, an injection molding process to produce a rigid polymeric channel housing 12 may be employed.

Those of ordinary skill in the art from this disclosure will understand that the present invention is not limited to a generally U-shaped in cross section channel housing 12. For instance, the channel housing could be generally L-shaped in cross section by omitting the second leg 12b (not shown) without affecting the operation of the optical fiber attenuator 10 as will be apparent from the description hereinafter.

Referring to FIGS. 2, 4 and 5, the optical fiber attenuator 10 includes a spring clip 14 having a first end 14a and a second end 14b positioned within the channel housing 12. The first end 14a of the spring clip 14 is secured to the channel housing 12. The second end 14b is adjustably positioned to move between a first position spaced from the first end 14a and a second position adjacent to the first end 14a. As best shown in FIG. 2, the spring clip 14 is generally C-shaped in plan view. However, it is understood by those of ordinary skill in the art from this disclosure that the present invention is not limited to a spring clip which is generally C-shaped in plan view. For instance, the spring clip 14 could be oval shaped (not shown) in plan view without departing from the spirit and scope of the invention.

In a preferred embodiment, the first end 14a of the spring clip 14 is secured to the base 12c of the channel housing 12 using a screw 15 threadably secured to a hole 24 in the base 12C. The screw 15 extends through a hole (not shown) in a tab 14c that extends from the first end 14a of the spring clip 14. The tab 14c is positioned within a groove 22 formed in the base 12c. The groove 22 allows the spring clip 14 to be fully positioned within the first and second legs 12a, 12b of the channel housing 12 thereby decreasing the overall size of the fiber optic attenuator 10. Those skilled in the art will realize that the first end 14a may be secured. to the channel housing 12 using various fastening means. For example, the first end 14a may be adhesively bonded, clamped or otherwise secured to the channel housing 12.

In the preferred embodiment, the spring clip 14 includes a first hook 18a which protrudes from the first end 14a and a second hook 18b which protrudes from a second end 14b. The first and second hooks 18a and 18b of the spring clip 14 assist in securing the fiber optic cable 16 bundle to the spring clip 14 while the second end 14b of the spring clip 14 travels between the first position and the second position, as described in more detail hereinafter. One skilled in the art will realize that the first and second hooks 18a and 18b may be configured in any manner that will secure the fiber optic cable 16 to the first and second ends 14a and 14b while the second end 14b travels from or is held at or between the first position and the second position. For example, the fiber optic cable 16 bundle could be secured to the first and second ends 14a and 14b adhesively, by clamping, by wire ties or the like (not shown).

In the preferred embodiment, the spring clip is constructed, but not limited to, beryllium cooper. Those skilled in the art will realize that the spring clip may be constructed of a metallic, polymeric or like spring material that substantially regains its original shape after being adjusted numerous times from the first position to the second position or to positions between the first and second positions.

Referring now to FIGS. 4 and 5, the fiber optic cable 16 is wrapped around the spring clip 14 such that as the second end 14b is moved between the first and second positions, the attenuation of the fiber optic cable 16 is modified by changing a radius of curvature of the fiber optic cable 16. The spring clip 14 and channel housing 12 are sized to permit a plurality of loops of the fiber optic cable 16 to be wrapped around the spring clip 14. In the preferred embodiment, 9–125/900 micron tight buffered single mode fiber optic cable 16 with an outer diameter of 900 microns is wrapped around the spring clip 14 three times. Preferably, when the fiber optic cable 16 is wrapped around the spring clip 14 three times (not shown), the spring clip 14 has a diameter of approximately one-half inch in the first position. Additionally, in the preferred embodiment, the fiber optic cable 16 bundle has a minor diameter of approximately thirty-five hundredths of an inch when the spring clip 14 is in the second position.

One skilled in the art will realize that the optical fiber attenuator 10 is not limited to the use of 9–125/900 micron tight buffered single mode fiber optic cable 16. For example, the channel housing 12 and spring clip 14 can be sized such that nearly any diameter fiber optic cable 16 may be wrapped around the spring clip 14 and held at the first end 14a and the second end 14b of the spring clip 14 inside the channel housing 12. The fiber optic cable 16 may be wrapped around the spring clip 14 as few as one time and as many times as the spring clip 14 and channel housing 12 are sized to accommodate. The number of times the fiber optic cable 16 is wrapped around the spring clip 14 and the size of the spring clip 14 will determine the range of attenuation that is achievable for a particular optical fiber attenuator 10. For example, a larger version of the preferred embodiment of the optical fiber attenuator 10 could be produced with the spring clip 14 and channel housing 12 modified to permit a greater range of light loss by incorporating additional turns of fiber in the bundle, or by use of multiple bundles.

In the preferred embodiment, the fiber optic cable 16 bundle is bound with a sleeve 17 at the interface of the fiber optic cable 16 bundle and the first and second hooks 18a and 18b (see FIGS. 4 and 5). The sleeve 17 is preferably in the form of tape, such as electrical tape. Binding the wrapped fiber optic cable 16 bundle with the sleeve 17 protects the fiber optic cable 16 from being damaged during insertion of the fiber optic cable 16 bundle into the jaws of the first and second hooks 18a and 18b. In addition, binding the fiber optic cable 16 bundle with the sleeve 17 generally prevents movement of the fiber optic cable 16 bundle or individual fiber optic cables 16 of the bundle either laterally, out of the jaws of the first and second hooks 18a and 18b or longitudinally, along the length of the fiber optic cable 16 if a force is applied to the fiber optic cable coming into or exiting the channel housing 12. One skilled in the art will realize that movement of the fiber optic cable 16 bundle or an individual fiber optic cable 16 of the bundle would likely change the radius of curvature of the fiber optic cable 16 bundle, thereby changing the attenuation of the optical fiber attenuator 10. The fiber optic cable 16 bundle may additionally be secured to the first and second hooks 18a and 18b using other types of tape, adhesive, by clamping or the like without departing from the spirit and scope of the present invention as long as the fiber optic cable 16 is protected from being damaged during insertion into the first and second hooks 18a and 18b and is prevented from moving relative to the first and second hooks 18a and 18b during use, thereby altering the radius of curvature of the fiber optic cable 16 bundle and the attenuation of the optical fiber attenuator 10.

The optical fiber attenuator 10 further includes a movable arm 20 mounted to move with respect to the channel housing 12 and having a first end 20a in engagement with the spring clip 14 adjacent to the second end 14b. The movable arm 20 is positioned in the optical fiber attenuator 10 such that a movement of the movable arm 20 causes the second end 14b of the spring clip 14 to move between the first position and the second position. The movable arm 20 is also able to hold the spring clip 14 at any position between or at the first and second positions. In the preferred embodiment, the movable arm 20 is comprised of, but is not limited to, a set screw 20 threadably fastened to the first leg 12a of the channel housing 12. The first end 20a of the set screw 20 is in engagement with the spring clip 14 adjacent to its second end 14b. Tightening the set screw 20 forces its first end 20a into the spring clip 14 and moves the second end 14b from a position anywhere from the first position or between the first position and the second position toward the second position. Loosening the set screw 20 permits the second end 14b to move from the second position or from any position between the second position and the first position toward the first position driven by the inherent property of the spring clip 14 to regain its original shape after being compressed.

One skilled in the art will realize that the movable arm 20 is not limited to a set screw threadably attached to the first leg 12a of the channel housing 12 as shown in the preferred embodiment. The movable arm 20 may be comprised of any rigid protrusion with a first end 20a which contacts the spring clip 14 and is able to adjust and hold the second end 14b at any position between or at the first position and the second position.

In use, the fiber optic cable 16 is wrapped around a mandrel (not shown) having a diameter yielding a fiber optic cable 16 bundle that corresponds to a fiber optic cable 16 bundle diameter in the first position. One skilled in the art will realize that the diameter of the mandrel and the number of turns of fiber optic cable 16 in a bundle is important in determining the attenuation range of the optical fiber attenuator 10. One skilled in the art will also realize that a mandrel is not required to set the diameter of the fiber optic cable 16 bundle but the use of a mandrel may improve repeatability and reliability of the optical fiber attenuator 10. For example, the fiber optic cable 16 bundle diameter may be estimated by wrapping the fiber optic cable around a users finger or the like to determine the diameter of the fiber optic cable 16 bundle. Once the fiber optic cable 16 bundle diameter and the number of turns in the bundle is set, the fiber optic cable 16 bundle is bound with a sleeve 17 at two positions approximately one hundred and eighty degrees apart. Wrapping the fiber optic cable bundle with the sleeves 17, sets the diameter of the fiber optic cable 16 bundle. The fiber optic cable 16 bundle is then inserted into the spring clip 14 with the first and second ends 14a and 14b engaging the sleeves 17. Once the spring clip 14 is secured in place with the screw 15, the second end. 14b of the spring clip 14 is moved between the first and second positions by turning the movable arm 20 to change the attenuation of the fiber optic cable 16 by changing a radius of curvature of the fiber optic cable 16 bundle. One skilled in the art will realize that a plurality of attenuation ranges may be attained by altering the number of turns in the fiber optic cable 16 bundle or by altering the diameter of the fiber optic cable 16 bundle. In addition, one skilled in the art will realize that a plurality of attenuation ranges may be obtained by altering the size of the spring clip 14 and the channel housing 12 such that the radius of curvature and diameter of the fiber optic cable 16 bundle between the first and second positions is altered. The preferred embodiment of the optical fiber attenuator 10 is particularly suited for use in broadband cable television applications. The compact design of the optical fiber attenuator in the preferred embodiment permits direct attachment of the optical fiber attenuator 10 to a cable television optical hybrid or detector.

It will be appreciated by those skilled in the art that changes can be made to the embodiments described above without parting from the broad inventive concept thereof. For instance, both the first and second legs 12a, 12b of the channel housing 12 could be omitted if the distance between the first and second ends 14a, 14b of the spring clip 14 could be adjusted as part of the structure of the spring clip 14 (not shown). While the principles of the invention have been described above in connection with specific apparatus, it is to be clearly understood that this description is made only by way of example and not as a limitation on the scope of the invention.

What is claimed is:

1. An optical fiber attenuator for adjusting attenuation of a fiber optic cable, said attenuator comprising:

a channel housing generally L-shaped in cross section, said channel housing defining a first leg and a base extending therefrom; and a spring clip positioned within the channel housing, said clip having a first end and a second end; said first end being secured to said channel housing, the second end being adjustably positioned to move between a first position spaced from said first end and a second position adjacent said first end of said clip whereby the fiber optic cable can be wrapped around said spring clip such that as the second end of the spring clip is moved between the first and second positions the attenuation of the fiber optic cable is modified by changing a radius of curvature of the fiber optic cable.

2. The optical fiber attenuator of claim 1 wherein said spring clip is constructed of beryllium copper.

3. The optical fiber attenuator of claim 1 wherein the spring clip and channel housing are sized to permit a plurality of loops of the fiber optic cable to be wrapped around said spring clip.

4. The optical fiber attenuator of claim 1 further including a movable arm mounted to move with respect to said channel housing and having a first end in engagement with said second end of said spring clip such that movement of the arm causes said second end of said spring clip to be located at one of said first position, said second position and anywhere between said first position and said second position, said movable arm holding said spring clip at one of said first position, said second position and any position between said first position and said second position.

5. The optical fiber attenuator of claim 4 wherein said movable arm is a set screw threadably fastened to said first leg of said channel housing and said first end of said set screw is in engagement with said second end of said spring clip.

6. The optical fiber attenuator of claim 1 wherein said channel housing is generally U-shaped in cross section.

7. A combination fiber optic cable and optical fiber attenuator for adjusting an attenuation of the fiber optic cable, said combination comprising:

a channel housing generally L-shaped in cross section, said channel housing defining a first leg and a base extending therefrom;

a spring clip positioned within the channel housing, said clip having a first end and a second end; said first end being secured to said channel housing, the second end being adjustably positioned to move between a first position spaced from said first end and a second position adjacent said first end of said clip; and a fiber optic cable wrapped around said spring clip such that as the second end of the spring clip is moved between the first and second positions the attenuation of the fiber optic cable is modified by changing a radius of curvature of the fiber optic cable.

8. The combination of claim 7 wherein said spring clip is constructed of beryllium copper.

9. The combination of claim 7 wherein the spring clip and channel housing are sized to permit a plurality of loops of the fiber optic cable to be wrapped around said spring clip.

10. The combination of claim 7 further including a movable arm mounted to move with respect to said channel housing and having a first end in engagement with said second end of said spring clip such that movement of the arm causes said second end of said spring clip to be located at anywhere between said first position and said second position, said movable arm holding said spring clip at any position between said first position and said second position.

11. The combination of claim 10 wherein said movable arm is a set screw threadably fastened to said first leg of said channel housing and said first end of said set screw is in engagement with said second end of said spring clip.

12. The combination of claim 7 wherein said channel housing is generally U-shaped in cross section.

13. The combination of claim 7 further including a first hook protruding from said first end and a second hook protruding from said second end.

14. The combination of claim 7 further including a sleeve binding said fiber optic cable at an interface between each of said first and second ends and said fiber optic cable.

* * * * *